United States Patent [19]

Strassheimer

[11] Patent Number: 4,785,948

[45] Date of Patent: Nov. 22, 1988

[54] BLOW MOLDED PLASTIC CONTAINER HAVING A REINFORCED WALL STRUCTURE AND PREFORM THEREFOR

[76] Inventor: Herbert Strassheimer, 9722 Wild Oak Dr., Windermere, Fla. 32786

[21] Appl. No.: 44,469

[22] Filed: May 1, 1987

Related U.S. Application Data

[63] Continuation-in-part of Ser. No. 10,459, Feb. 3, 1987, abandoned.

[51] Int. Cl.$^4$ .................. B65D 1/02; B65D 23/00; B65D 1/42
[52] U.S. Cl. ........................... 215/1 C; 220/70; 220/72; 220/83; 428/35; 428/542.8; 428/36.92
[58] Field of Search ............... 215/1 C; 220/66, 70, 220/72, 83; 428/35, 542.8; 264/522

[56] References Cited

U.S. PATENT DOCUMENTS

| | | | |
|---|---|---|---|
| 3,029,963 | 4/1962 | Evers | 215/1 C |
| 3,881,621 | 5/1975 | Adomaitis | 215/1 C |
| 4,024,975 | 5/1977 | Uhlig | 215/1 C |
| 4,134,510 | 1/1979 | Chang | 215/1 C |
| 4,170,622 | 10/1979 | Uhlig | 215/1 C X |
| 4,261,948 | 4/1981 | Krishnakumar et al. | 215/1 C X |
| 4,334,627 | 6/1982 | Krishnakumar et al. | 215/1 C |
| 4,403,706 | 9/1983 | Mahajan | 220/70 X |
| 4,525,401 | 6/1985 | Pocock et al. | 215/1 C X |
| 4,603,831 | 8/1986 | Krishnakumar et al. | 215/1 C X |
| 4,620,639 | 11/1986 | Yoshino | 215/1 C |

FOREIGN PATENT DOCUMENTS

| | | | |
|---|---|---|---|
| 185229 | 10/1983 | Japan | 264/522 |
| 8100390 | 2/1981 | World Int. Prop. O. | 215/1 C |

Primary Examiner—Sue A. Weaver
Attorney, Agent, or Firm—Bachman & LaPointe

[57] ABSTRACT

A plastic preform for forming blow molded plastic containers and plastic containers wherein the container has a tubular body portion adjacent a bottom portion and extending onto said bottom portion having circumferentially spaced, radially extending, continuous alterations in wall thickness. In one embodiment the container also includes at least one continuous, thickened portion at discrete locations on at least one of the inside and outside wall face adjacent the bottom structure extending completely circumferentially around the periphery thereof.

19 Claims, 4 Drawing Sheets

BLOW MOLDED PLASTIC CONTAINER HAVING A REINFORCED WALL STRUCTURE AND PREFORM THEREFOR

CROSS-REFERENCE TO RELATED APPLICATIONS

This is a continuation-in-part of U.S. patent application Ser. No. 010,459, Filed Feb. 3, 1987, now abandoned.

BACKGROUND OF THE INVENTION

This invention relates to thermoplastic containers for the retention of fluids under pressure, such as carbonated beverages and the like. These containers may be prepared from a preform or parison which may be injection molded, followed by blow molding said parison into a suitably shaped container. A typical thermoplastic material is poly (ethylene terephthalate) or PET, although others can be used.

The container configuration generally includes a neck portion with a cap-receiving means, a shoulder portion depending therefrom, a side wall or main body portion depending from the shoulder portion and a bottom wall joined to the side wall. In many of these containers the bottom wall has a champagne bottle bottom configuration with an internal, axially inwardly directed, generally conical part.

The bottom wall of these containers represents a weak part of the container. Also, it is desirable to provide a bottom shape capable of serving as a bottom support.

Thus, beverage under pressure within the container has a tendency to deform the bottom wall, as for example inverting the inwardly directed conical part to render the bottom wall unstable.

Many attempts have been made to overcome these problems while at the same time providing a construction which is inexpensive and economical to process. For example, U.S. Pat. No. 3,881,621 provides a ribbed strengthening at the bottom wall; however, this still provides insufficient strengthening. U.S. Pat. No. 4,134,510 provides a plurality of concentric annular strengthening ribs and a plurality of additional intersecting radial ribs in a complex and expensive procedure. U.S. Pat. Nos. 4,620,639, 4,261,948, 4,603,831 and 4,334,627 utilize a plurality of inwardly projecting rigid ribs so that the bottom wall is thicker at the ribbed portion than the remainder of the bottom wall; however, this results in a container having substantial and sharply defined differences in wall thickness with resultant sharp temperature differences in processing a difficult processing control problems.

It is therefore a principal object of the present invention to provdie a thermoplastic container having a stable and reinforced bottom wall configuration.

It is a further object of the present invention to provide a container as aforesaid which is simple in construction and inexpensive to prepare.

It is a still further object of the present invention to provide a preform or parison for the aforesaid container which is simple in configuration and inexpensive to prepare.

Further objects and advantages of the present invention will appear hereinbelow.

SUMMARY OF THE INVENTION

In accordance with the present invention it has now been found that the foregoing objects and advantages may be readily obtained. The preform or parison of the present invention is for forming blow molded plastic bottles and comprises a neck portion defining an opening, a tubular body portion depending therefrom, and an integral bottom structure depending from said tubular body portion, said preform having an outside wall face and an inside wall face with at least one of the inside wall face and the outside wall face of the tubular body portion adjacent the bottom structure and extending onto said bottom structure having a plurality of flat faces, preferably having a hexagonal configuration. In a preferred embodiment, the outside wall face of the tubular body portion is round and the inside wall face is hexagonal, although the inside face can be round and the outside hexagonal or both can be hexagonal. The preform is injection molded and generally is provided with an axially inwardly directed conical part on said bottom structure.

The blow molded plastic container comprises a neck portion defining an opening, a bottom portion, a tubular body portion interconnecting said neck portion and bottom portion, said bottom portion having an internal, axially inwardly directed, generally conical part, said container having an inside wall face and an outside wall face, with the inside wall face of said tubular body adjacent said bottom portion and extending onto said bottom portion having circumferentially spaced, radially extending continuous alterations in wall thickness which are generally gradual or progressive. The alterations in thickness generally extend over the bottom portion and over the conical port. The outside wall is preferably round, although it could be provided with a plurality of flat faces, as a hexagonal configuration.

The construction of the present invention provides significant advantages. The preform and blow molded container of the present invention are economical and easy to prepare. The construction of the container reinforces the base without sharply defined differences in wall thickness. Temperature control is easier and more uniform properties are obtained. The gradual transition in wall thickness at the highly stressed base results in no sharp projections, a uniform blow molding procedure and uniform plastic flow.

Moreover, the construction of the present invention does not suffer from the significant disadvantages of those constructions having a ribbed base. Ribs require slots in the core. To fill these slots one needs a high, sustained injection pressure while the preform is cooling and hence residual stresses. Also, the molding procedure is expensive requiring high pressures and expensive metering through a hot runner requiring shut-off pins, etc. Ribs result in non-uniform temperature distribution which is unfavorable in the stretch blow process. The present invention overcomes these disadvantages and provides a construction with no sharp corners and recesses and with low pressure, stress-free molding. The regularly undulating cross-section of the base and adjacent side wall with its radial symmetry provides no sharp temperature gradients in the cross-section.

The foregoing features and advantages of the construction of the present invention and other will be discussed hereinbelow.

BRIEF DESCRIPTION OF THE DRAWINGS

The foregoing will be more readily apparent when considered in connection with the following illustrative examples wherein.

DETAILED DESCRIPTION

Figure 1:
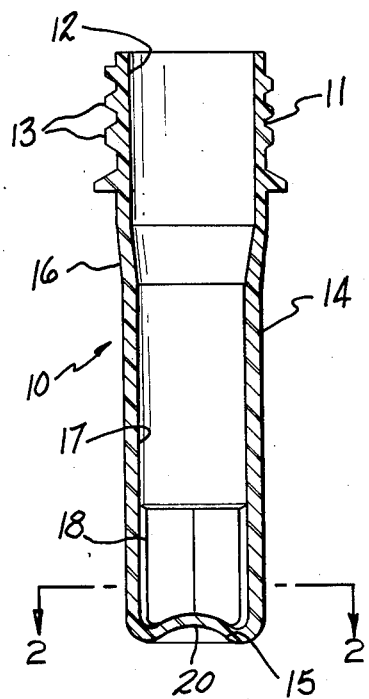
FIG. 1 is a sectional view of a preform of the present invention.
Figure 2:
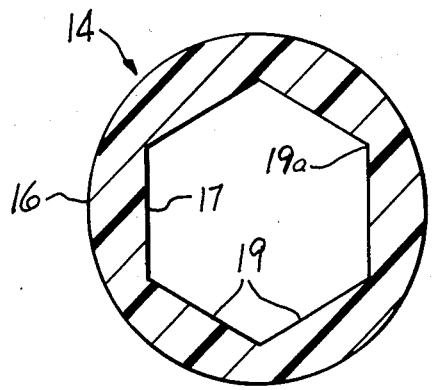
FIG. 2 is an enlarged sectional view along lines 2—2 of FIG. 1.

Referring now to the drawings in detail, a plastic parison or preform 10 is formed by injection molding from a synthetic resin which can be biaxially oriented, as for example poly (ethylene terephthalate). The preform 10 has a neck portion 11 defining an opening 12 and it may be provided with external threads 13 to serve as the site for attachment of a cap on the finished, blow molded plastic container. The preform 10 has a tubular body portion 14 depending from the neck portion 11 and an integral bottom structure 15 depending from the tubular body portion. The preform 10 has an outside wall face 16 and an inside wall face 17. The inside wall face 17 of the tubular body portion 14 is provided with a thickened portion 18 which extends onto bottom structure 15 and is characterized by a plurality of flat faces 19 which come together at intersecting points 19a as clearly shown in FIG. 2 which shows a preferred hexagonal configuration. Three or more of said flat faces may be used, although the hexagonal configuration is preferred. The bottom structure 15 is preferably provided with an axially inwardly directed conical part 20, although a flat bottomed construction can readily be used.

Figure 3:
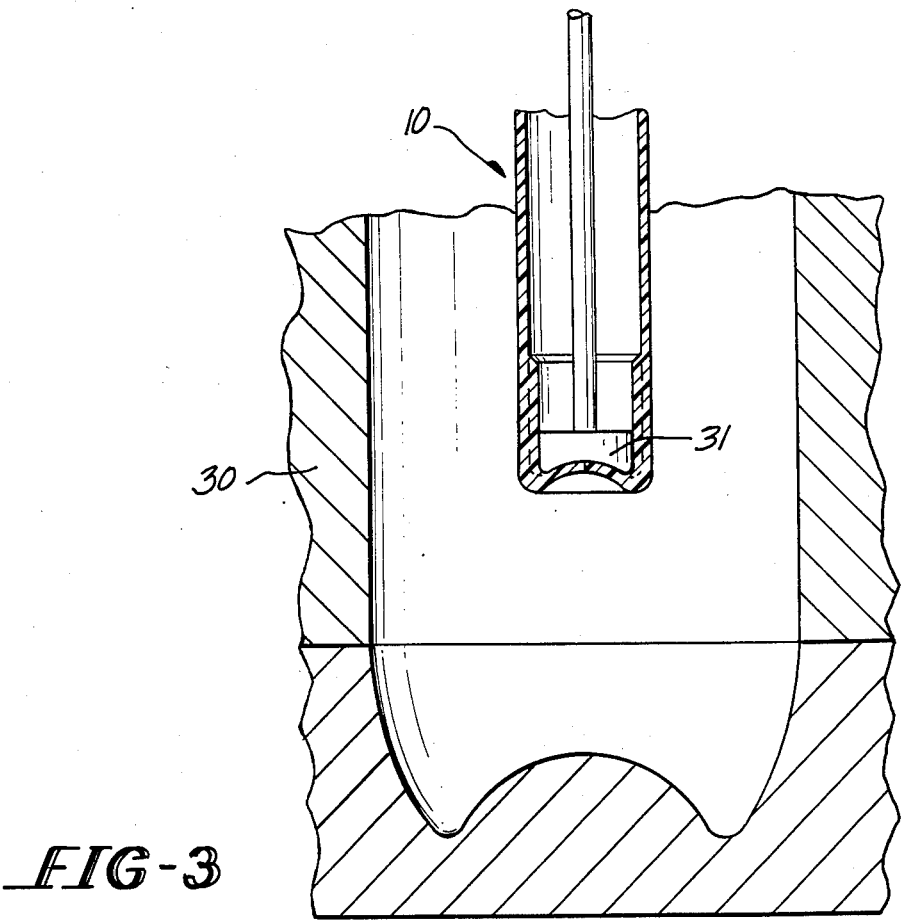
FIG. 3 is a partial sectional view taken through a mold for molding a container and having associated therewith the preform of FIG. 1 which is to be stretched and blown therein to form a container of the present invention.

The thus formed preform is brought to a temperature at which blow molding can be accomplished which may be done by heating a previously formed parison or forming the hot parison in line with the blow molding operation and suitably adjusting the temperature thereof. The heated preform is then placed in a blow mold having the configuration of the desired container as blow mold 30 shown in FIG. 3 and while blowing compressed air thereinto, the interior side of bottom portion 15 is pushed down by movable means 31 to effect biaxial orientation. The particular blow mold 30 shown in FIG. 3 has an internal configuration which allows the formation of a plastic container 40 (see FIG. 4) having a desired configuration.

Thus, blow molded plastic container 40 is formed having a neck portion 41 defining an opening 42, a bottom portion 43, a tubular body portion 44 interconnecting the neck portion 41 and the bottom portion 43. Neck portion 41 is provided with external threads 45 to serve as the site for attachment of a cap on the container, as with preform 10. The bottom portion 43 has an internal, axially inwardly directed generally conical part 46.

Figure 5:
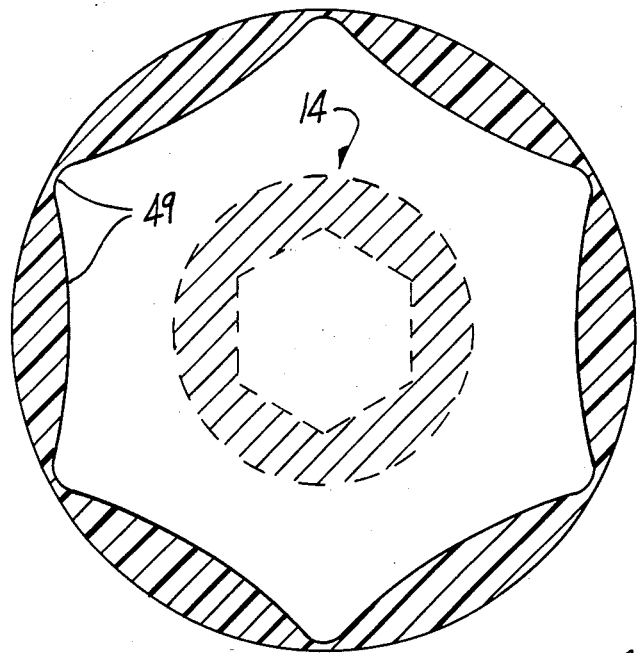
FIG. 5 is an enlarged sectional view taken along lines 5—5 of FIG. 4, with the corresponding sectional view of FIG. 2 superimposed therein in phantom.

Container 40 has an inside wall face 47 and an outside wall face 48. The inside wall face 47 of tubular body portion 44 adjacent bottom portion 43 and extending onto the bottom portion is provided with circumferentially spaced, radially extending, continuous alterations in wall thickness 49 as clearly shown in FIG. 5. As can be seen in FIG. 5, the said alterations in wall thickness are progressive or gradual so that no sharp edges are provided. The alterations in wall thickness 49 extend over bottom portion 43 and also over conical part 46 to provide significant advantages of the present invention.

Figure 4:
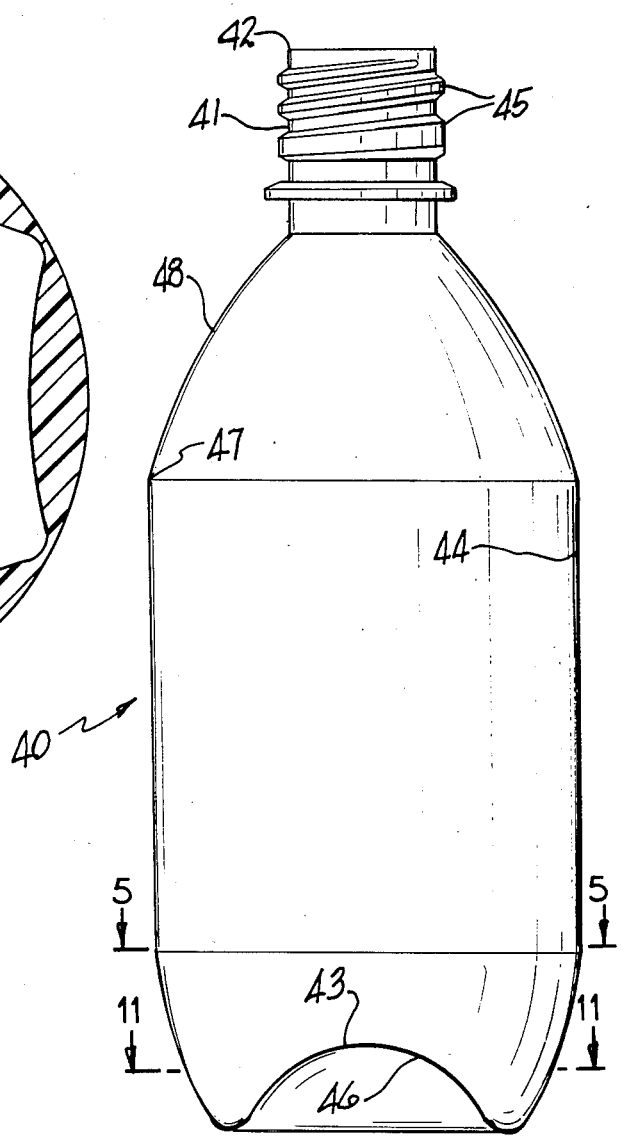
FIG. 4 is an elevational view of a container formed in FIG. 3.

FIG. 5 shows an enlarged sectional view taken along the lines 5—5 of FIG. 4 wherein the solid lines clearly show the gradual or progressive alternations in wall thickness which characterize the lower portion of the container and the bottom portion thereof. Superimposed inside the cross sectional view of FIG. 5 in phantom is an enlarged sectional view of the preform of FIG. 2 wherein it is clearly seen that the points of contact of the flat inside faces of the preform form the reduced thickness wall sections of the final container, and the flat faces progressively form the thickened portions.

Figure 6:
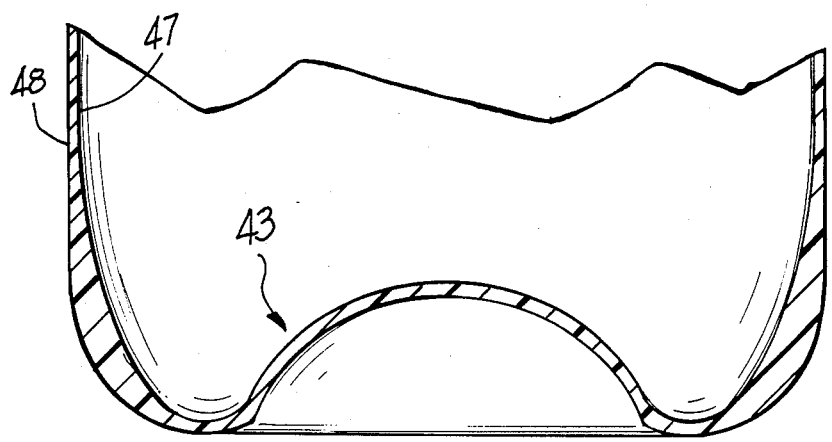
FIG. 6 is a partial, enlarged sectional view of the bottom portion and adjacent tubular body portion of the container of FIG. 4.

FIG. 6 is a partial, enlarged sectional view of bottom portion 43 and adjacent tubular portion 47 of container 40 wherein the thickened wall is clearly shown.

Figure 7:
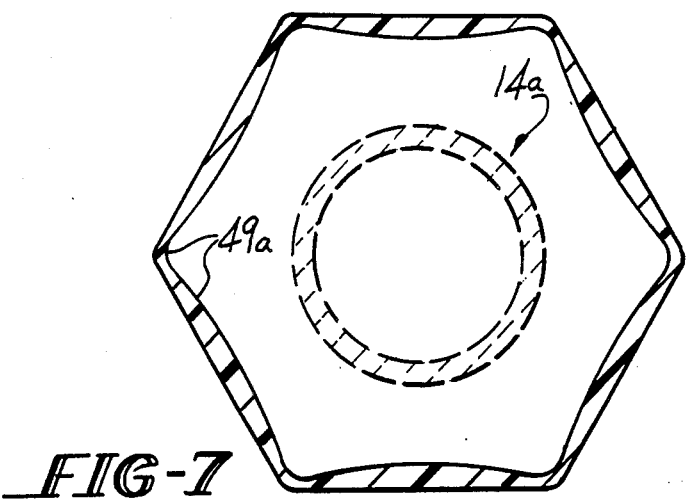
FIGS. 7 and 8 are views similar to FIG. 5 showing alternate embodiments.
Figure 8:
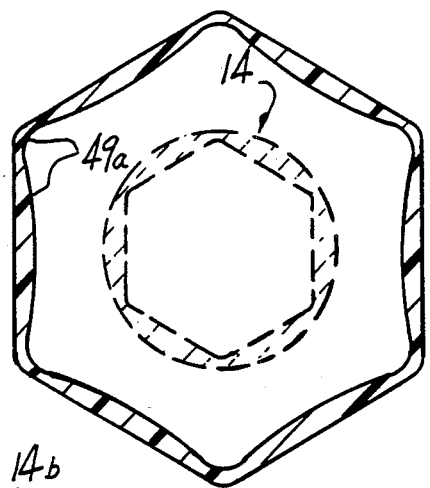

FIG. 5 shows a preferred embodiment wherein the inside wall face of the tubular body portion of the preform adjacent preform bottom structure and extending onto said bottom structure is characterized by a hexagonal configuration on the outside wall face is round. Also, the outside wall face of the container is characterized by a round configuration at the tubular body portion adjacent bottom portion, and the corresponding inside face of the container is characterized by the aforesaid alternations in wall thickness. However, other embodiments may readily be employed within the scope of the present invention. For example, FIG. 7 is a view similar to FIG. 5 with a round preform 14a and a hexagonal blow mold resulting in the inside wall face of the container tubular body portion adjacent the bottom portion and extending onto the bottom portion having circumferentially spaced alterations in thickness 49a. It should be noted that the corresponding outside wall face of the container is hexagonal. FIG. 8 is a corresponding sectional view showing a preform configuration similar to FIG. 2, with a blow molded configuration similar to FIG. 7 resulting in the container of FIG. 8 having a configuration similar to that of FIG. 7.

Figure 9:
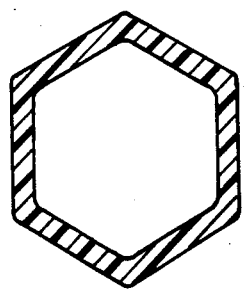
FIGS. 9 and 10 are view similar to FIG. 2 showing alternate embodiments.
Figure 10:
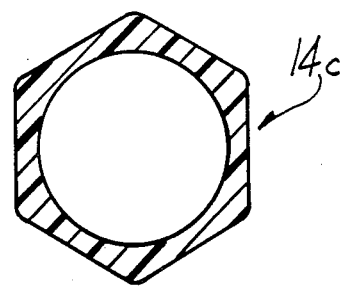

FIGS. 9 and 10 show all alternate preform configurations wherein the lower portion of the preform 14b, of FIG. 9 has a hexagonal configuration both inside and out, and in FIG. 10 the outside wall face of the preform 14c at least in the lower portion thereof is hexagonal while the corresponding inside wall face is round. In both FIGS. 9 and 10 the resulting container will be characterized by the aforesaid alterations in wall thickness.

Figure 11:
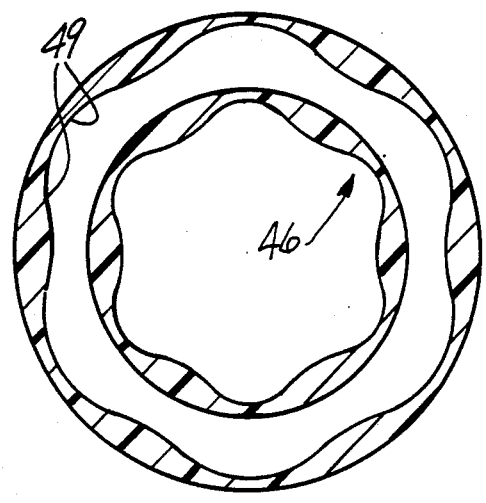
FIG. 11 is an enlarged sectional view taken along lines 11—11 of FIG. 4.

FIG. 11 is an enlarged sectional view taken along lines 11—11 of FIG. 4 through connecting part 46 showing that the alterations in wall thickness extend over the said connecting part.

Figure 13:
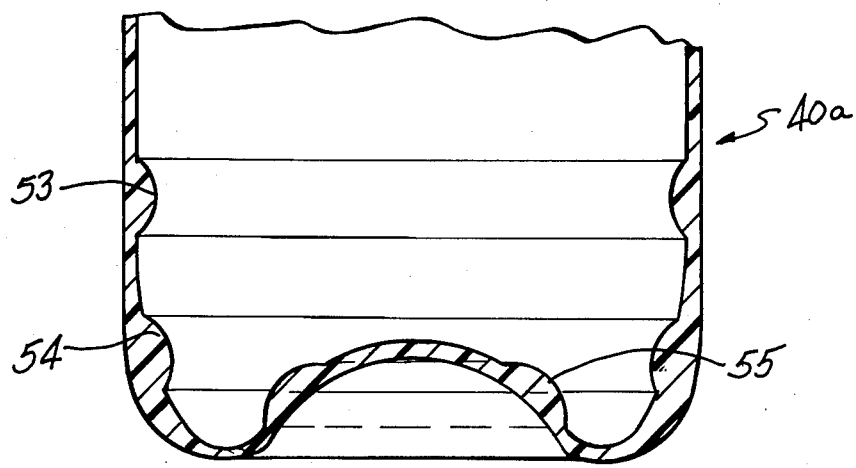
FIG. 13 is a view similar to FIG. 6 showing a still further alternate preferred embodiment of the present invention.
Figure 12:
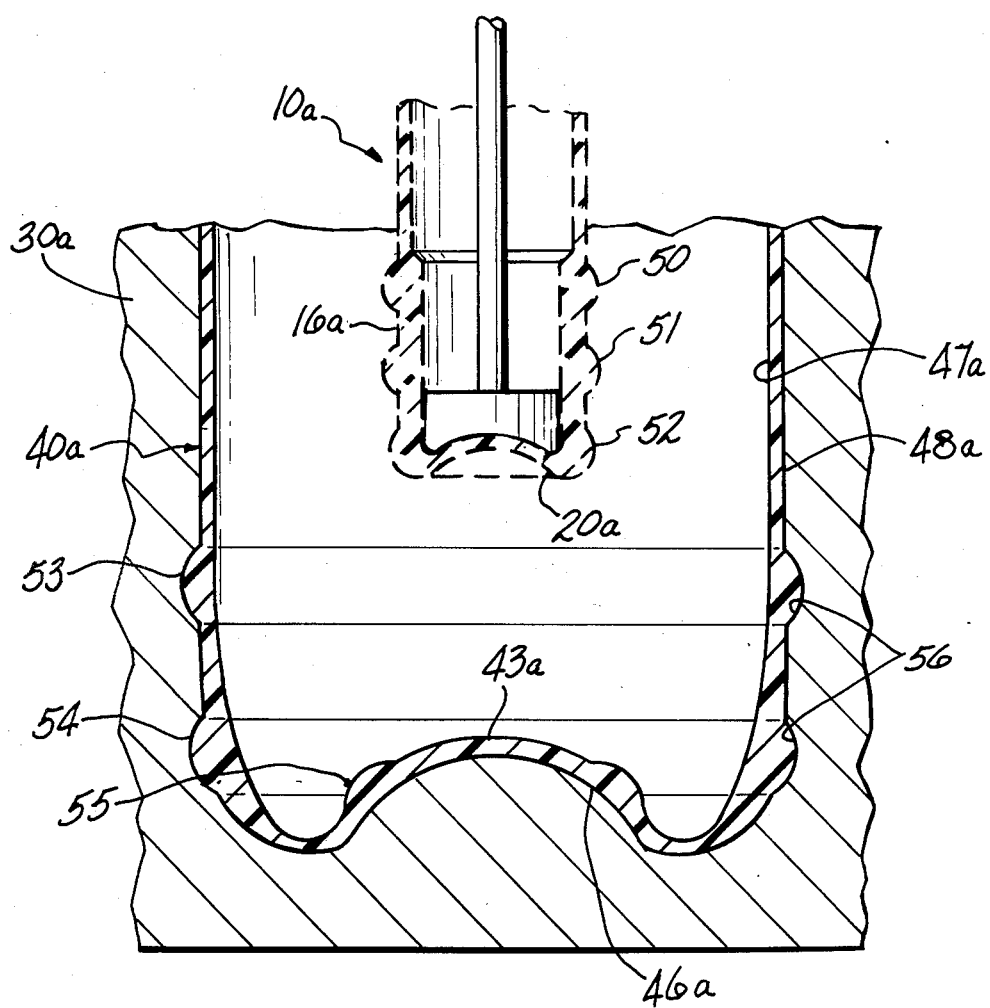
FIG. 12 is a view similar to FIG. 3 showing an alternate, preferred embodiment of the present invention.

FIGS. 12 and 13 show preferred alternate embodiments of the present invention wherein the plastic preform 10a in addition to the features discussed hereinabove is characterized by including at least one continuous thickened portion at discrete locations on the outside wall face 16a adjacent the bottom structure 20a extending completely around the circumference of said outside wall face 16a. Preferably, at least two (2) of said continuous thickened portions are provided and FIG. 12 shows three (3) of same; uppermost thickened portion 50, intermediate thickened portion 51 and lowermost thickened portion 52 extending from bottom structure 20a.

This results in a blow molded plastic container 40a having, in addition to the features discussed hereinabove, at least one, continuous thickened portion at discrete locations on at least one of the inside and outside wall face adjacent the bottom portion extending completely circumferentially around the periphery thereof. The continuous, thickened portions may be on either the inside or outside wall face, or on both if desired.

Thus, FIG. 12 shows container 40a with bottom portion 43a, inside wall face 47a and outside wall face 48a. Uppermost preform thickened portion 50 becomes uppermost container thickened portion 53, intermediate preform thickened portion 51 becomes intermediate container thickened portion 54, and the lowermost preform thickened portion 52 becomes lowermost container thickened portion 55 situated on conical part 46a. It is noted that container thickened portions 53 and 54 are situated on outside wall face 48a by providing blow mold 30a with corresponding recesses 56. If the blow mold has a smooth inner face, the container thickened portions will be located on the inside wall surface as with thickened portions 55 situated on the inside of conical part 46a, and with the embodiment of FIG. 13 wherein all thickened portions 53, 54 and 55 are located on inside surfaces.

The embodiments of FIGS. 12 and 13 are especially advantageous in combination with the features described in conjunction with FIGS. 1–11. They provide equal distribution of the force reaching the wave-like sections 49, levelling out the load between thicker and thinner parts of the cross-section. In addition, the thickened portions 53, 54 and 55 act like hoops of a barrel, keeping the staves from moving outward. They also help impede eversion of the base and thus contribute to the stability of the bottle. The foregoing is accomplished without adversely affecting the advantageous characteristics of the container of the present invention.

Thus, it can be seen that the container of the present invention provides numerous significant advantages. The multi-faceted section of the core and/or of the injection mold provides a simple and convenient means for obtaining an improved container in the final blow molded product. This can be conveniently done by itself or together with a multi-faceted blow mold. Numerous embodiments readily present themselves, as for example a hexagonal injection core with a round injection mold and a round bottle mold. Alternatively, the injection core and injection mold can be round and the bottle mold hexagonal, the injection mold can be round, the injection core hexagonal and the blow mold hexagonal. Still further, the injection core and injection mold can both be hexagonal or the core round and injection mold hexagonal. Naturally, in place of the preferred hexagonal configurations, other polygons may be readily utilized. As can be readily seen, the apices and sides of the polygons on the core, injection mold or blow mold may or may not be aligned.

The result is significant advantages in the final container. The bottom portion and adjacent side walls are characterized by no sharp corners or recesses and hence low pressure stress free molding. Moreover, no sharp temperature gradient is present in the cross sections because of the regularly undulating cross section with radial symmetry. Moreover, the base and aforesaid walls of the container are significantly strengthened avoiding everting of the inwardly directed conical part and providing for significant container stability under pressure.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A plastic preform for forming blow molded plastic bottles which comprises: a neck portion defining an opening; a tubular body portion depending therefrom; and an integral bottom structure depending from the tubular body portion; said preform having an outside wall face and an inside wall face, with at least one of the inside wall face and the outside wall face of the tubular body portion adjacent the bottom structure and extending onto said bottom structure having a plurality of flat faces capable of forming a blow molded plastic bottle with a bottom portion having circumferentially spaced radially extending continuous alterations in wall thickness with a regularly undulating cross-section across the circumference thereof, wherein said alterations in wall thickness are progressive and gradual.

2. A preform according to claim 1 wherein said flat faces form a hexagonal configuration.

3. A preform according to claim 1 wherein the inside face adjacent the bottom structure is hexagonal and the outside face round.

4. A preform according to claim 1 wherein the outside face adjacent the bottom structure is hexagonal and the inside face round.

5. A preform according to claim 1 which is injection molded.

6. A preform according to claim 1 including an axially inwardly directed conical part on said bottom structure.

7. A plastic preform for forming blow molded plastic bottles which comprises: a neck portion defining an opening; a tubular body portion depending therefrom; and an integral bottom structure depending from the tubular body portion; said preform having an outside wall face and an inside wall face, with at least one of the inside wall face and the outside wall face of the tubular body portion adjacent the bottom structure and extending into said bottom structure having a plurality of flat faces, including at least one continuous, thickened portion in discrete locations on the outside wall face adjacent the bottom structure extending completely around the circumference of said outside wall face.

8. A preform according to claim 7 including at least two of said continuous thickened portions.

9. A preform according to claim 8 wherein a lower most of said discrete continuous thickened portions extends from the bottom structure.

10. A blow molded plastic container comprising: a neck portion defining an opening; a bottom portion; a tubular body portion interconnecting said neck and bottom portions, said bottom portion having an internal, axially inwardly directed conical part; said container having an inside wall face and an outside wall, with the inside wall face of said tubular body portion adjacent having circumferentially spaced, radially extending, continuous alterations in wall thickness with a regularly undulating cross-section across the entire circumference of the inside wall face wherein said alterations in wall thickness are progressive and gradual.

11. A container according to claim 10 wherein said alterations in wall thickness extend over said bottom portion and said conical part.

12. A container according to claim 10 wherein said outside face adjacent said bottom portion is round.

13. A container according to claim 10 wherein said outside face adjacent said bottom portion is characterized by having a plurality of flat faces.

14. A container according to claim 13 wherein said plurality of flat faces form a hexagonal configuration.

15. A container according to claim 10 wherein said plastic is poly (ethylene terephthalate).

16. A blow molded plastic container comprising: a neck portion defining an opening; a bottom portion; a tubular body portion interconnecting said neck and bottom portions, said bottom portion having an internal, axially inwardly directed conical part; said container having an inside wall face and an outside wall, with the inside wall face of said tubular body portion adjacent said bottom portion and extending onto said bottom portion having circumferentially spaced, radially extending, continuous alterations in wall thickness with a regularly undulating cross-section across the entire circumference of the inside wall face wherein said alterations in wall thickness are progressive and gradual, including at least one continuous, thickened portion at discrete locations on at least one of the inside and outside wall face adjacent the bottom portion extending completely circumferentially around the periphery thereof.

17. A container according to claim 16 including at least two of said spaced discrete thickened portions.

18. A container according to claim 26 wherein said at least one discrete thickened portion is located on the inside wall face.

19. A container according to claim 16 including at least one continuous, discrete thickness portion on said bottom portion.

* * * * *

UNITED STATES PATENT AND TRADEMARK OFFICE
CERTIFICATE OF CORRECTION

PATENT NO. : 4,785,948

DATED : November 22, 1988

INVENTOR(S) : Herbert Strassheimer

It is certified that error appears in the above-identified patent and that said Letters Patent is hereby corrected as shown below:

Column 6, claim 7, line 68, before "said", delete "into" and insert --onto--.

Column 7, claim 10, line 17, after "adjacent", insert --said bottom portion and extending onto said bottom portion--.

Column 8, claim 18, line 25, delete "26" and insert --16--.

Column 8, claim 19, line 29, after "discrete", delete "thickness" and insert --thickened--.

Signed and Sealed this

Ninth Day of May, 1989

Attest:

DONALD J. QUIGG

Attesting Officer

Commissioner of Patents and Trademarks